(12) United States Patent
Nochlin

(10) Patent No.: US 12,189,592 B2
(45) Date of Patent: Jan. 7, 2025

(54) CENTRALIZED DATABASE MANAGEMENT SYSTEM FOR DATABASE SYNCHRONIZATION USING INVERTIBLE BLOOM FILTER CELL INDICES

(71) Applicant: Fivetran Inc., Oakland, CA (US)

(72) Inventor: Jason Nochlin, Denver, CO (US)

(73) Assignee: FIVETRAN INC., Oakland, CA (US)

( * ) Notice: Subject to any disclaimer, the term of this patent is extended or adjusted under 35 U.S.C. 154(b) by 6 days.

(21) Appl. No.: 17/976,353

(22) Filed: Oct. 28, 2022

(65) Prior Publication Data

US 2024/0143569 A1 May 2, 2024

(51) Int. Cl.
G06F 7/02 (2006.01)
G06F 16/00 (2019.01)
G06F 16/22 (2019.01)
G06F 16/27 (2019.01)

(52) U.S. Cl.
CPC ...... *G06F 16/2255* (2019.01); *G06F 16/2282* (2019.01); *G06F 16/27* (2019.01)

(58) Field of Classification Search
CPC ... G06F 16/2255; G06F 16/2282; G06F 16/27
See application file for complete search history.

(56) References Cited

U.S. PATENT DOCUMENTS

2017/0199921 A1* 7/2017 Khanlarov .......... G06F 16/2358
2018/0300204 A1* 10/2018 Amirishetty .............. G06F 3/06
2019/0370381 A1* 12/2019 Klein .................... G06F 16/182
2022/0156280 A1* 5/2022 Nochlin .............. G06F 11/1446
2023/0153321 A1* 5/2023 Nochlin .............. G06F 16/2365
707/747

FOREIGN PATENT DOCUMENTS

CN         114328464 A    *  4/2022
WO    WO-2022109173 A1    *  5/2022  .......... G06F 11/1446

OTHER PUBLICATIONS

Luo et al, "Optimizing Bloom Filter: Challenges, Solutions, and Comparisons," IEEE Communications Surveys & Tutorials, 2018, revised Jan. 7, 2019, retrieved from https://arxiv.org/abs/1804.04777 (Year: 2019).*

Dai, Haipeng et al, "Bloom Filters and its Variants," Nanjing University, 2015. (Year: 2015).*

* cited by examiner

*Primary Examiner* — Bruce M Moser
(74) *Attorney, Agent, or Firm* — Fenwick & West LLP

(57) ABSTRACT

A database management system performs data synchronization with lower bandwidth consumption and higher efficiency. The system generates a third invertible bloom filter (IBF) by subtracting a second IBF from a first IBF. The system determines a first total count of elements in a first indexed cell of the IBF. The first indexed cell is associated with a first index. Responsive to the first total count of elements being equal to a critical value, the system reads a first sum of elements in the first indexed cell, computes one or more indices corresponding to the determined first sum of elements, and compares the first index with each of the computed indices. Responsive to the first index not matching any of the computed indices, the system determines that the first indexed cell in the third IBF is not a cell associated with a change between the first IBF and the second IBF.

18 Claims, 12 Drawing Sheets

Invertible Bloom Filter table
240

| | 231 | 232 | 233 | 234 | 235 | 236 | 237 | 238 |
|---|---|---|---|---|---|---|---|---|
| Count | 0 | 0 | 0 | 0 | 0 | 0 | 0 | 0 |
| idSum | 0 | 0 | 0 | 0 | 0 | 0 | 0 | 0 |
| hashSum | 0 | 0 | 0 | 0 | 0 | 0 | 0 | 0 |

241

| | 231 | 232 | 233 | 234 | 235 | 236 | 237 | 238 |
|---|---|---|---|---|---|---|---|---|
| Count | 0 | 1 | 0 | 1 | 0 | 0 | 1 | 0 |
| idSum | 0 | S1 | 0 | S1 | 0 | 0 | S1 | 0 |
| hashSum | 0 | Hk2 | 0 | Hk1 | 0 | 0 | Hk3 | 0 |

242

| ID | Email | Age | Paid? | Time Created |
|---|---|---|---|---|
| 1 | joe@gmail.com | 37 | TRUE | 2020-11-12 13:14 |
| 2 | alice@gmail.com | 43 | FALSE | 2020-9-1 15:16 |
| 3 | bob@gmail.com | 56 | TRUE | 2020-4-13 11:01 |

710

| Checksum |
|---|
| 8f6e |
| 7a4z |
| 6e2a |

720

| (Primary key, Checksum) |
|---|
| (1, 8f6e) |
| (2, 7a4z) |
| (3, 6e2a) |

730

| (Primary key, Email checksum, age, paid?, time created) |
|---|
| (1, 8f6e, 37, 1, 1401231235456) |
| (2, 7a4z, 43, 0, 1400257897123) |
| (3, 6e2a, 56, 1, 1342534256546) |

|  | 231 | 232 | 233 | 234 |
|---|---|---|---|---|
| Count | 1 | 2 | 0 | 1 |
| idSum | v1 | v1 ⊕ v2 | 0 | v2 |
| hashSum | Hk11 | Hk12 ⊕ Hk21 | 0 | Hk22 |

910

|  | 231 | 232 | 233 | 234 |
|---|---|---|---|---|
| Count | 1 | 2 | 1 | 0 |
| idSum | v1 | v1 ⊕ v3 | v3 | 0 |
| hashSum | Hk11 | Hk12 ⊕ Hk31 | Hk32 | 0 |

920

|  | 231 | 232 | 233 | 234 |
|---|---|---|---|---|
| Count | 0 | 0 | -1 | 1 |
| idSum | 0 | v2 ⊕ v3 | v3 | v2 |
| hashSum | 0 | Hk21 ⊕ Hk31 | Hk32 | Hk22 |

| | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Count | 1 | 1 | 0 | 1 | 0 | 1 | 1 | 1 | 0 | 0 | 1 | 0 | 1 | 0 | 1 |
| idSum | id1 | id2 | 0 | id4 | 0 | id1 | id4 | id2 | 0 | 0 | id2 | 0 | id1 | 0 | id4 |

1120

| | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Count | 1 | 0 | 1 | 0 | 1 | 1 | 0 | 1 | 0 | 0 | 0 | 1 | 2 | 1 | 0 |
| idSum | id1 | 0 | id4 | 0 | id3 | id1 | 0 | id4 | 0 | 0 | 0 | id3 | id1⊕id4 | id3 | 0 |

1130

| | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Count | 0 | 1 | -1 | 1 | -1 | 0 | 1 | 0 | 0 | 0 | 1 | -1 | -1 | -1 | 1 |
| idSum | 0 | id2 | id4 | id4 | id3 | 0 | id4 | id2⊕id4 | 0 | 0 | id2 | id3 | id4 | id3 | id4 |

1140

| | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Count | 0 | 1 | -1 | 1 | -1 | 1 | 1 | 0 | 1 | -1 | 1 | -1 | -1 | -1 | 1 |
| idSum | 0 | id2 | id4 | id4 | id3 | id1 | id4 | id2⊕id4 | id7 | id3 | id2 | id3 | id4 | id3 | id4 |

Pure cell/True positive

Pure cell/False positive/In the data

Pure cell/False positive/Not in the data

Non-pure cell

FIG. 11

```
┌─────────────────────────────────────────────────────────────┐
│ Generating a third invertible bloom filter by subtracting a second invertible │
│         bloom filter from a first invertible bloom filter                     │
│                            1210                                               │
└─────────────────────────────────────────────────────────────┘
                              │
                              ▼
┌─────────────────────────────────────────────────────────────┐
│ Determining a first total count of elements in a first indexed cell of the third │
│                    invertible bloom filter                                    │
│                            1220                                               │
└─────────────────────────────────────────────────────────────┘
                              │
                              ▼
┌─────────────────────────────────────────────────────────────┐
│ Responsive to the first total count of elements being equal to a critical     │
│     value, reading a first sum of elements in the first indexed cell          │
│                            1230                                               │
└─────────────────────────────────────────────────────────────┘
                              │
                              ▼
┌─────────────────────────────────────────────────────────────┐
│ Computing one or more indices corresponding to the determined first sum       │
│                          of elements                                          │
│                            1240                                               │
└─────────────────────────────────────────────────────────────┘
                              │
                              ▼
┌─────────────────────────────────────────────────────────────┐
│          Comparing the first index with each of the computed indices          │
│                            1250                                               │
└─────────────────────────────────────────────────────────────┘
                              │
                              ▼
┌─────────────────────────────────────────────────────────────┐
│ Responsive to the first index not matching any of the computed indices,       │
│ determining that the first indexed cell in the third invertible bloom filter is │
│ not a cell associated with a change between the first bloom filter and the    │
│                         second bloom filter                                   │
│                            1260                                               │
└─────────────────────────────────────────────────────────────┘
```

FIG. 12

CENTRALIZED DATABASE MANAGEMENT SYSTEM FOR DATABASE SYNCHRONIZATION USING INVERTIBLE BLOOM FILTER CELL INDICES

TECHNICAL FIELD

The present disclosure generally relates to the field of database synchronization technologies, and in particular, to a centralized database management system for database synchronization.

BACKGROUND

Data synchronization is a process of establishing data consistency between two or more databases. Synchronization between databases is an ongoing process that may need to be performed on a regular basis to maintain data consistency within systems. Conventional methods that compare and identify different records between two databases may involve costly operations such as scanning records in a data table and copying data records between databases, which often result in high bandwidth consumption. As a result, a method for synchronizing databases that is more efficient and less costly is desirable.

SUMMARY

Systems and methods are disclosed herein for a centralized database management system that performs data synchronization with lower bandwidth consumption and higher efficiency. The centralized database management system manages data synchronization and data reconciliation across multiple databases managed by multiple database management systems (DBMS) across different client servers. The centralized database management system generates and sends instructions that encode each data table into an invertible bloom filter and identifies differences between the two databases by performing a subtraction operation on the two invertible bloom filters and then a decode operation on the result of the subtraction.

In one aspect, a centralized database management system is presented to perform data synchronization with lower bandwidth consumption and higher efficiency. The system generates a third invertible bloom filter (IBF) by subtracting a second IBF from a first IBF. The system determines a first total count of elements in a first indexed cell of the IBF. The first indexed cell is associated with a first index. Responsive to the first total count of elements being equal to a critical value, the system reads a first sum of elements in the first indexed cell, computes one or more indices corresponding to the determined first sum of elements, and compares the first index with each of the computed indices. Responsive to the first index not matching any of the computed indices, the system determines that the first indexed cell in the third IBF is not a cell associated with a change between the first IBF and the second IBF. The centralized database management system does not need to compute the hashSum of the indexed cells to determine a change between a first invertible bloom filter and a second invertible bloom filter.

In another aspect, a non-transitory computer readable medium is presented for data synchronization with lower bandwidth consumption and higher efficiency. The non-transitory computer readable medium may be configured to store instructions, the instructions when executed by one or more processors causing the processor to perform operations. The operations may include generating a third invertible bloom filter (IBF) by subtracting a second IBF from a first IBF; determining a first total count of elements in a first indexed cell of the IBF. The first indexed cell is associated with a first index. Responsive to the first total count of elements being equal to a critical value, the operations may further include reading a first sum of elements in the first indexed cell, computing one or more indices corresponding to the determined first sum of elements, and comparing the first index with each of the computed indices. Responsive to the first index not matching any of the computed indices, the operations further include determining that the first indexed cell in the third IBF is not a cell associated with a change between the first IBF and the second IBF. Determining a change between a first invertible bloom filter and a second invertible bloom filter does not need to compute the hashSum of the indexed cells.

BRIEF DESCRIPTION OF THE DRAWINGS

FIG. 7 illustrates an exemplary row transformation process performed by a row representation transforming module, according to one embodiment.

FIG. 9 illustrates an exemplary embodiment for subtracting a second invertible bloom filter from a first invertible bloom filter, according to one embodiment.

FIG. 11 illustrates another exemplary embodiment for subtracting a second invertible bloom filter from a first invertible bloom filter, according to one embodiment.

FIG. 12 illustrates an exemplary process of determining a change between a first invertible bloom filter and a second invertible bloom filter, according to one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Overview

The FIGURES and the following description relate to preferred embodiments by way of illustration only. It should be noted that from the following discussion, alternative embodiments of the structures and methods disclosed herein will be readily recognized as viable alternatives that may be employed without departing from the principles of what is disclosed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Figure 1:
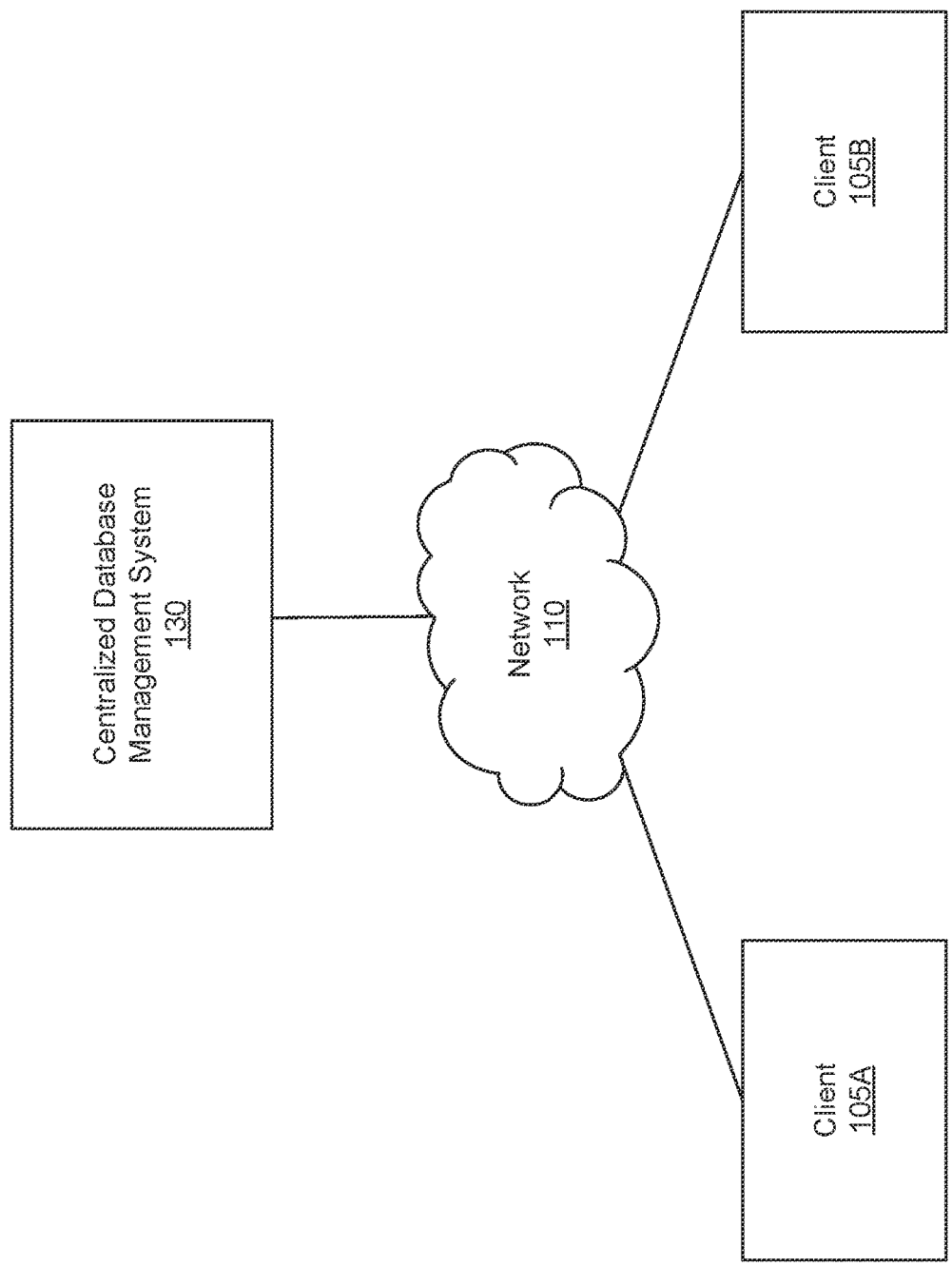
FIG. 1 is a high level block diagram of a system environment for a centralized database management system 130, according to one embodiment.

FIG. 1 is a high level block diagram of a system environment for a centralized database management system 130, in accordance with an embodiment. The system environment 100 shown by FIG. 1 includes one or more clients 105, such as client 105A and client 105B, which may be collectively referred to as clients 105, a network 110, and a centralized database management system 130. In alternative configurations, different and/or additional components may be included in the system environment 100.

The network 110 represents the communication pathways between the client 105 and centralized database management system 130. In one embodiment, the network 110 is the Internet. The network 110 can also utilize dedicated or private communications links that are not necessarily part of the Internet. In one embodiment, the network 110 uses standard communications technologies and/or protocols. Thus, the network 110 can include links using technologies such as Ethernet, Wi-Fi (802.11), integrated services digital network (ISDN), digital subscriber line (DSL), asynchronous transfer mode (ATM), etc. Similarly, the networking protocols used on the network 110 can include multiprotocol label switching (MPLS), the transmission control protocol/Internet protocol (TCP/IP), the hypertext transport protocol (HTTP), the simple mail transfer protocol (SMTP), the file transfer protocol (FTP), etc. In one embodiment, at least some of the links use mobile networking technologies, including general packet radio service (GPRS), enhanced data GSM environment (EDGE), long term evolution (LTE), code division multiple access 2000 (CDMA2000), and/or wide-band CDMA (WCDMA). The data exchanged over the network 110 can be represented using technologies and/or formats including the hypertext markup language (HTML), the extensible markup language (XML), the wireless access protocol (WAP), the short message service (SMS) etc. In addition, all or some of the links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

In one embodiment, client 105 may be a database system that stores and/or manages data tables. While two clients 105A and 105B are illustrated in FIG. 1, in practice any number of multiple clients 105 may communicate with the centralized database management system 130 in the environment 100. Each database may be a relational database that provides searchable access to a plurality of data tables. Each of the plurality of tables comprises a collection of records stored in the database, and each record includes a unique primary key that provides searchable access to each specific record stored on the database. In some embodiments, the data table may not include unique primary keys. Each table may further include a plurality of data fields for storing different types of data, such as integers, floats, Booleans, chars, arrays, strings and more. In one embodiment, each database may implement a database management system (DBMS) that allows each database to execute database related instructions independently. For example, the DBMS for a database may provide for the independent creation of an invertible bloom filter for the plurality of data tables stored on the primary database. The DBMS for a database may also transform a row of a table into a row representation based on instructions received from the centralized database management system 130. Moreover, the DBMS for databases may provide functions for independent insertion or deletion of records within each of the data table for data synchronization with other databases.

Each data table may be associated with a set of metadata. The metadata may include information on the database type of database, the maximum value of the primary key of the records within the data table, the number of records currently stored within the data table, total data storage size of the table and average storage size of the rows in the table. Metadata may further include information associated with database schema, which may include information related to how data is constructed, such as how data is divided into database tables in the case of relational databases. Database schema information may contain information on each column (i.e., each data field) defined with in the table, such as type for each field, size for each field, relationships, views, indexes, types, links, directories, etc.

The centralized database management system 130 may manage and perform data synchronization between one or more data tables stored across multiple clients such as 105A and 105B. The centralized database management system 130 may be any processor-based computing system capable of generating structured query language (SQL) type instructions or any other relational database management system instructions. The centralized database management system 130 may transmit and receive responses to these instructions from clients 105 over the data network 110.

The centralized database management system 130 may perform functionalities for managing data synchronization between clients 105, such as determining size for invertible bloom filters, estimating the number of different records, generating and sending instructions to clients 105 for generating row representations and generating invertible bloom filters, performing operations such as subtraction on invertible bloom filters, decoding invertible bloom filters, and generating instructions to clients 105 for performing operations that synchronize the databases. The centralized database management system 130 may determine and send instructions to clients 105 for updating the respective database so that a destination database is in synchronization with a source database. Further details with regard to the functionalities performed by the centralized database management system 130 are discussed below in conjunction with FIG. 4.

Encoding Data Using Invertible Bloom Filters

Figure 2:
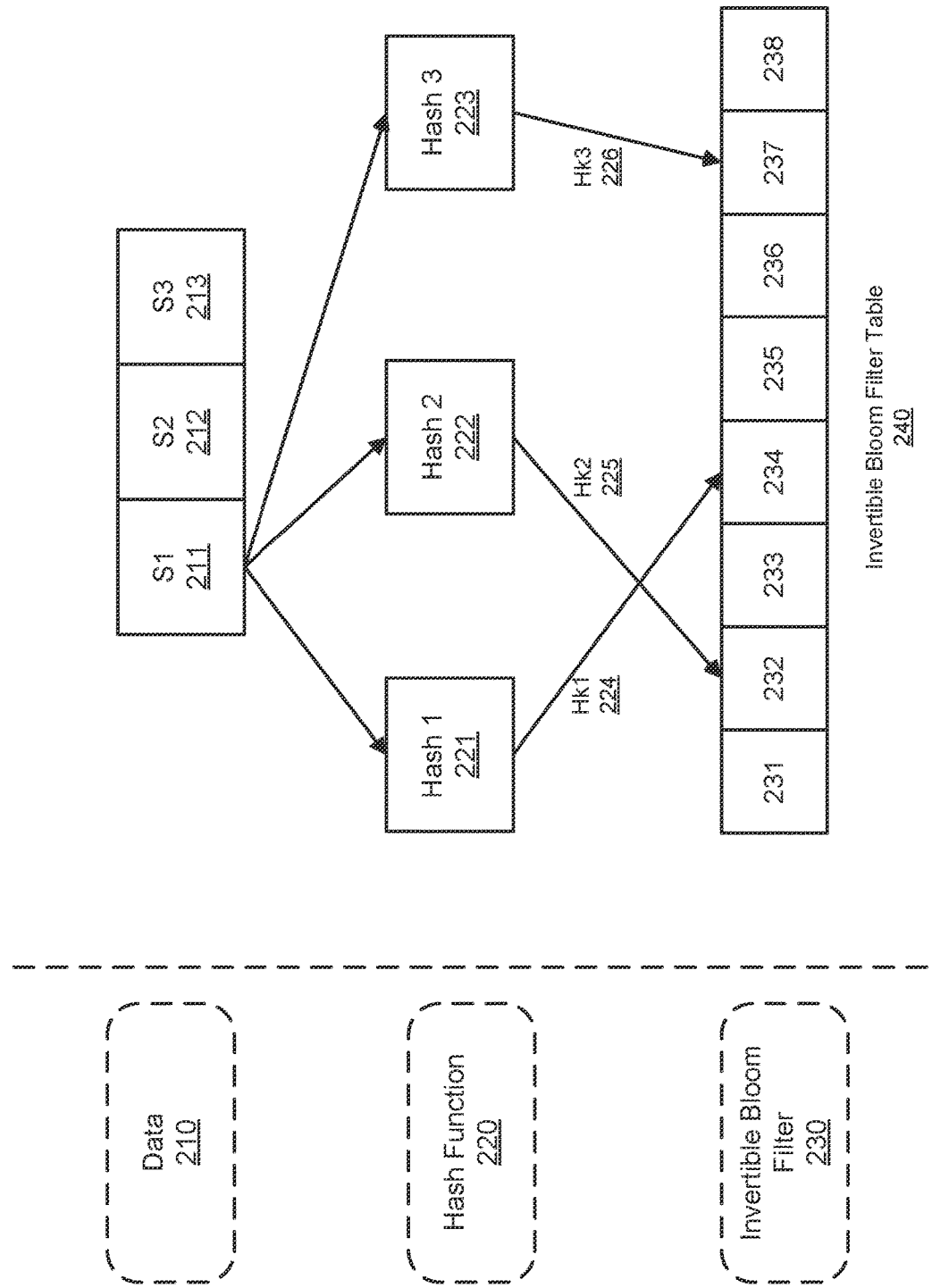
FIG. 2 illustrates an exemplary process for encoding data using an invertible bloom filter, according to one embodiment.

FIG. 2 illustrates an exemplary embodiment for encoding data 210 using an invertible bloom filter 230. In FIG. 2, data 210 may be an array of elements 211, 212, and 213. While only three elements are illustrated in FIG. 2, data 210 may include any number of elements. Each element may be stored as a type of data, such as a tuple that includes a key-value pair. The invertible bloom filter 230 may be initialized with 8 cells such as cells 231-238. The illustrated invertible bloom filter 230 may use one or more hash functions such as the three different hash functions 220 such as hash functions 221, 222, and 223 to generate hash keys for each element 211-213, where each hash function may generate a hash key for each element. For example, to encode element 211 into the invertible bloom filter 230, element S1 is hashed into three hash keys Hk1 224, Hk2 225, and Hk3 226, using the three hash functions 221, 222, and 223. Each hash function may generate a different hash key. For example, passing value of S1 211 into hash function 221 may result in a hash key Hk1 224, which maps S1 into cell 234 of an invertible bloom filter table 240. The invertible bloom filter table 240 is part of the invertible bloom filter 230 and is maintained by the invertible bloom filter 230 for storing information associated with each element mapped to a respective index. Similarly, S1 211 is further hashed using hash function 222 and 223, mapping element S1 into cells 232 and 237 respectively. An exemplary embodiment of the invertible bloom filter table 240 is discussed in greater detail in FIG. 3.

Figure 3:
FIG. 3 illustrates one embodiment of an exemplary invertible bloom filter table, according to one embodiment.

FIG. 3 illustrates one embodiment of an exemplary invertible bloom filter table 240. The invertible bloom filter table 240 may be initialized as a table with a fixed size (e.g., fixed number of columns.) The invertible bloom filter table 240 may include one or more of the following fields: count, idSum and hashSum. The count keeps track of the number of elements mapped to the respective index and is incremented by 1 each time an element is mapped to the index. The field idSum keeps track of sum (addition or exclusive-or operation) of inserted elements. Each time an element is mapped to a respective index, idSum is updated by adding (or XOR) the element. The field hashSum keeps track of sum (addition or exclusive-or operation) of hash key for the inserted elements. Each time an element is mapped to a cell, hashSum is updated by adding (or XOR) the hash key of the element. In some embodiments, the invertible bloom filter table 240 may include additional fields such as a valueSum field that keeps track of sum of values of inserted elements, if each element corresponds to a key-value pair. As illustrated in FIG. 3 the invertible bloom filter table 240 is of size eight since the invertible bloom filter table 240 has 8 cells (e.g., cells 231-238) and the table may be initialized with null values. To encode element S1 into the invertible bloom filter 230, the element S1 is mapped to indices 232, 234 and 237, based on hash functions. Each field of the invertible bloom filter table 242 including count, idSum, and hashSum is updated as illustrated in invertible bloom filter table 242, where count for each mapped cell increments by 1, idSum is updated by XOR the mapped element, and hashSum is updated by XOR the hash key of the mapped element.

Figure 4:
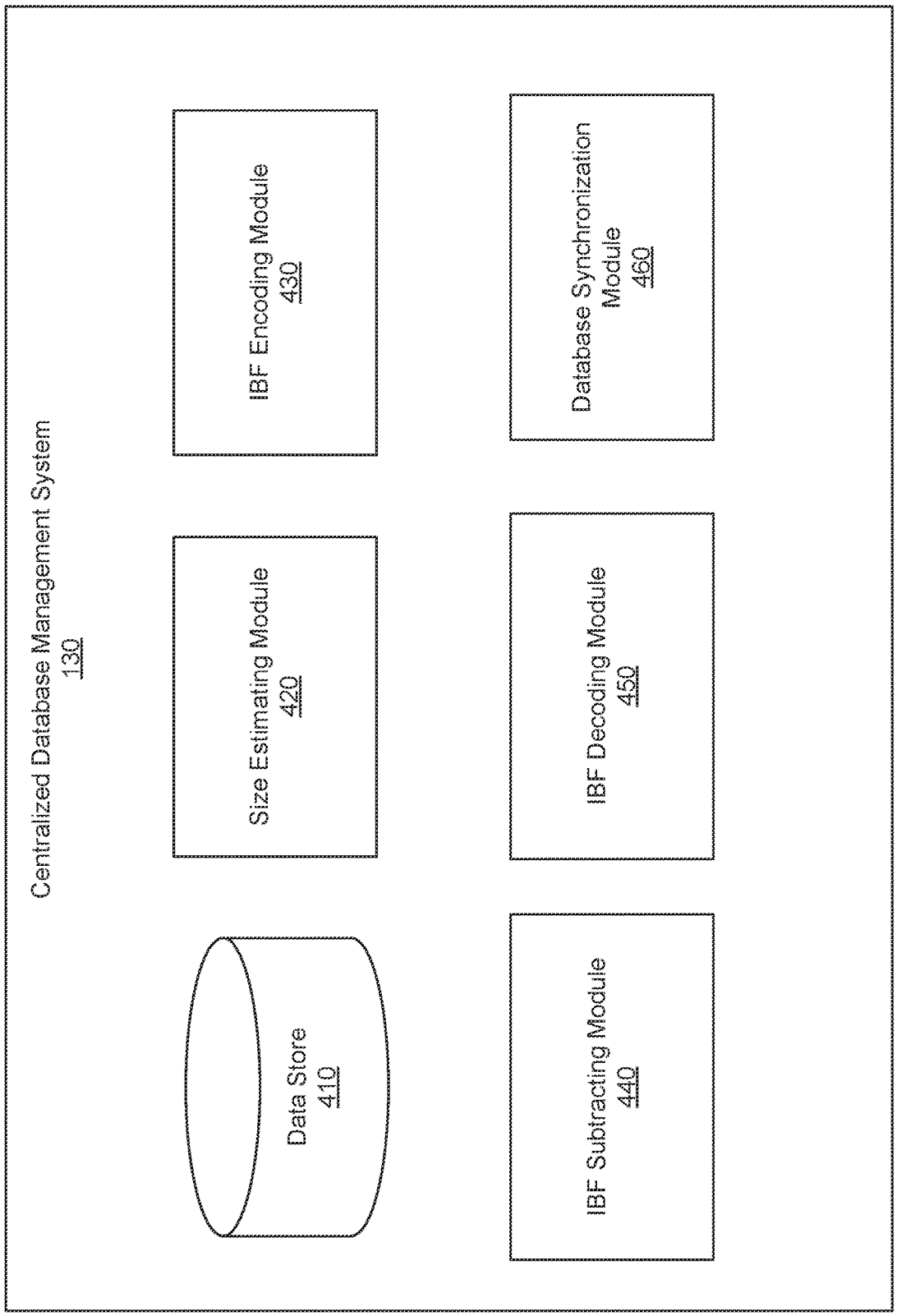
FIG. 4 illustrates an exemplary embodiment of a centralized database management system, according to one embodiment.

FIG. 4 illustrates an exemplary embodiment of the centralized database management system 130. The centralized database management system 130 may include a data store 410 that stores retrieved metadata and other data such as previous versions of invertible bloom filters, a size estimating module 420 that determines a size for invertible bloom filters, an IBF encoding module 430 that generates invertible bloom filters, an IBF subtracting module 440 that performs subtractions on invertible bloom filters, an IBF decoding module 450 that decodes an invertible bloom filter, and a database synchronization module 460 that generates instructions for synchronizing databases.

Data store 410 may store retrieved metadata information associated with databases. In some embodiments, data store 410 may also store other data such as invertible bloom filters that were generated previously and may be retrieved in subsequent steps of the synchronization process. Data store 410 may also include historical data associated with previously performed synchronizations, such as historical number of different elements, or historical number of updates within a period of time. The historical data stored in the data store 410 may be used to estimate number of differences by the size estimating module 420 which is discussed in greater detail below.

Figure 5:
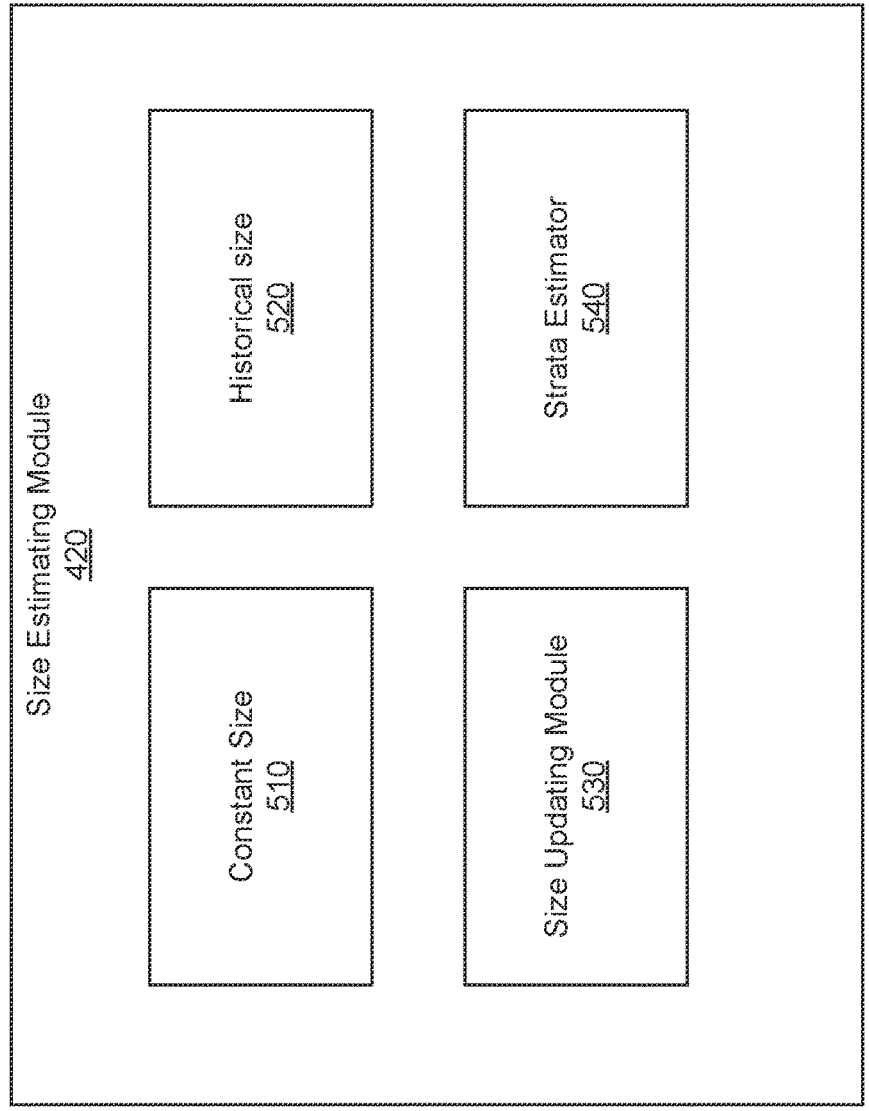
FIG. 5 illustrates an exemplary embodiment for a size estimating module, in accordance with on embodiment, according to one embodiment.

The size estimating module 420 determines a size for invertible bloom filters based on an estimated number of different records. The size estimating module 420 may estimate number of different records using various methods, such as using a constant size, using historical data, through an updating process or through a strata estimator. The different methods may be used independently from each other or may be used in conjunction with other methods. In one embodiment, the size estimating module 420 may determine a size based on metadata (e.g., the size is determined to be a percentage or correlated with the number of rows in the table). The different methods for determining size are discussed in detail in accordance with FIG. 5, which includes a size estimating module 420 includes a constant size module 510, a historical size module 520, a size updating module 530, and a strata estimator 540.

The constant size 510 module may assign a constant size to an invertible bloom filter. The constant size may be a number that does not depend on other factors such as size of a data table. In one embodiment, the constant size may be pre-determined (e.g., by a human). The constant size may be a number that is much greater (e.g., by convention or common sense) than an estimated number of different records between databases to ensure that invertible bloom filters function properly with a larger successful rate during an invertible bloom filter decoding process. The constant size may be an arbitrarily big number that is highly unlikely to result in an issue when generating the invertible bloom filters. However, using a large invertible bloom filter may result in waste in space and create inefficiencies. To refine the size, the determined constant size may also be adjusted by the size updating module 530 responsive to observations of number of differences. The decoding process for an invertible bloom filter is discussed in accordance with IBF decoding module 450.

The historical size module 520 determines size based on historical data including historical numbers of changes in records. The historical size module 520 may train and use a machine learning model for predicting the estimated number of differences based on historical data stored in the data store 410. In one embodiment, the historical size module 520 may train a machine learning model to predict the number of different records between a source database and a destination database. The training data may further include time intervals associated with the estimated number of different records. In one embodiment, the historical size module 520 may also train a machine learning model to predict the number of updates occurred to a source database within a time interval (or within various time intervals). The historical size module 520 may determine a size for invertible bloom filters based on the estimated number of updates. In one embodiment, the machine learning model may be a supervised or unsupervised machine learning model that is trained based on features extracted from historically observed differences and other information such as time interval, time of the day, time of the year, size of data tables, etc.

The size updating module 530 may update a determined size based on observed data associated with synchronizations performed afterwards. In one embodiment, the size updating module 530 may receive data associated with a synchronization process and, responsive to observing that the number of differences is significantly smaller that the determined size, the module 530 may determine to reduce the initially determined size. As an example, the size estimating module 420 size may initially determine the size to be a constant that is large enough that ensures proper functioning of the invertible bloom filter, such as a size of 500,000. After performing one synchronization, 10 differences may be observed. The size updating module 530 may reduce the size to 50,000. Responsive to one more observation of 10 differences from another synchronization, the size updating module 530 may further reduce the size to 5,000. The iterative process may be terminated until a predetermine criteria (such as a minimum size threshold) is achieved. In one embodiment, the size updating module 530 may also determine a size for a backup invertible bloom filter, which is activated responsive to the original invertible bloom filter is approaching capacity limit.

In one embodiment, the size updating module 530 may implement a resizable invertible bloom filter. The size updating module 530 may generate a resizable invertible bloom filter at a first snapshot of a source database. In one embodiment, the size updating module 530 may determine a maximum size for the first snapshot. The size updating module 530 may also determine a set of smaller sizes that the resizable invertible bloom filter may be shrunken to (e.g., a set of possible sizes that are predetermined). The size updating module 530 may determine a size for a second snapshot of the source database. The size updating module 530 may attempt to encode the snapshot into a size that is smaller than the maximum size. The size updating module 530 may request a second invertible bloom filter of the smaller size from the source database. Responsive to the smaller size invertible bloom filter failing to be decoded by the IBF decoding module 450, the size updating module 530 may re-attempt the operation of encoding the second snapshot using a bigger size available from the set of possible sizes. The process is repeated iteratively until the maximum possible size is reached.

In one embodiment, the size estimating module 420 may use the strata estimator 540 for estimating the number of differences. The strata estimator 540 may first divide all elements in the source data table and the destination data table into different levels of partitions, each partition containing different numbers of elements. The strata estimator 540 may encode each partition into an invertible bloom filter for each data table. The strata estimator 540 may then attempt to decode the pair of invertible bloom filters at each level for the two databases. If the invertible bloom filters for a level of partitions are successfully decoded, then the strata estimator 540 may add a count to the estimate, where the count is proportional to the number of elements recovered from the decoding process. Further details with regard to a decoding process is discussed below in accordance with the IBF decoding module 450.

Continuing with the discussion of FIG. 4, the IBF encoding module 430 encodes a data table into an invertible bloom filter. The IBF encoding module 430 may also generate and send instructions to databases for encoding a data table into an invertible bloom filter. Although the IBF encoding module 430 is illustrated to be included in the centralized database management system 130, clients 105 may also perform the functionalities described here in accordance with the IBF encoding module 430.

Figure 6:
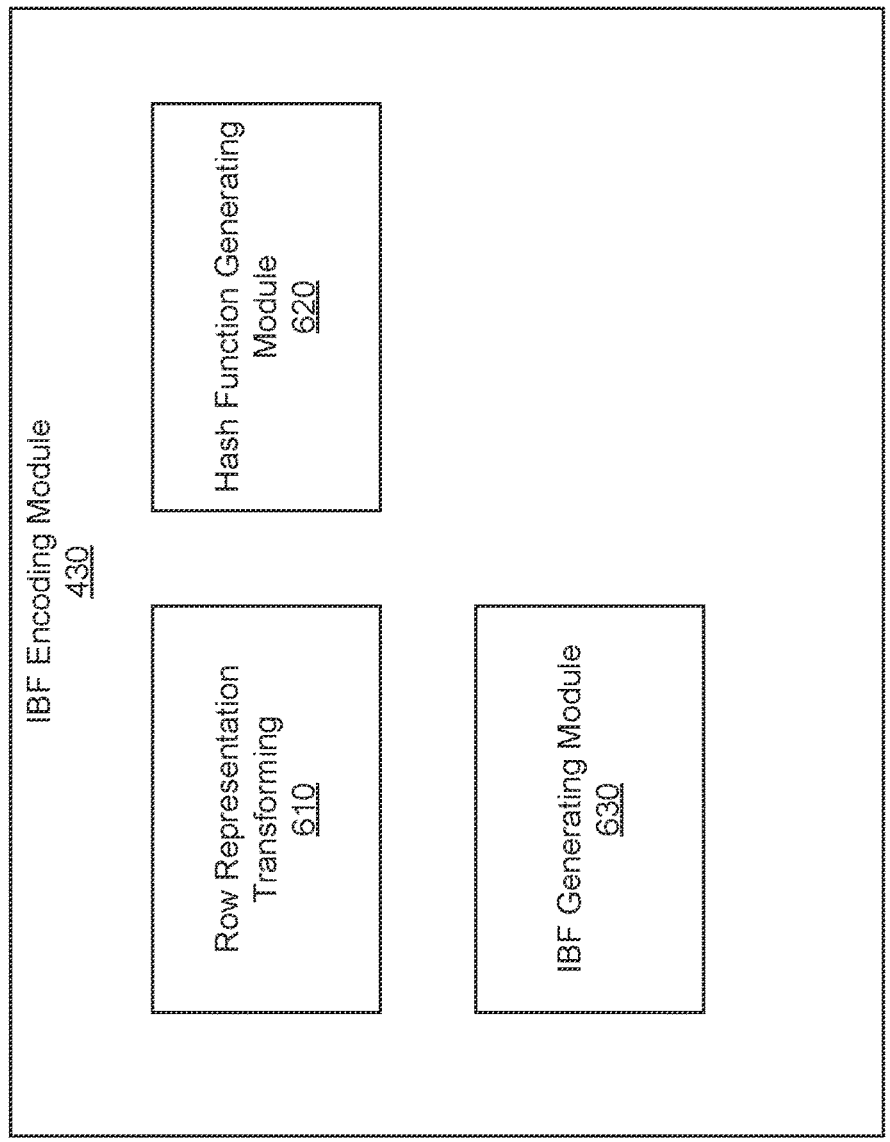
FIG. 6 illustrates an exemplary embodiment various row representations, according to one embodiment.

In one embodiment, the IBF encoding module 430 may use a SQL query for generating an IBF for a data table in a database environment. The SQL query takes a data table as input, and outputs an encoded IBF. The IBF encoding module 430 may also use other database languages (such as XQuery, XML, etc.) that are capable of managing transactions associated with data records within a database environment for encoding a data table into invertible bloom filters. FIG. 6 illustrates an exemplary embodiment of the IBF encoding module 430, which includes a row representation transforming module 610 that transforms rows in data table into row representations, a hash function generating module 620 that determines hash functions for the invertible bloom filters, and an IBF generating module 630 that uses determined hash function to generate invertible bloom filters and invertible bloom filter tables. Functionalities for each module is discussed in detail below.

Row representation transforming module 610 transforms each row of a data table into a row representation that is used for encoding invertible bloom filters. Each row of a table may be referred to as a data record or an element. Each data record may include multiple fields with different types of data. In one embodiment, the row representation transforming module 610 may transform a row into a checksum or a tuple. The tuple may be a key-value pair, with the key being the primary key of the row, and checksum encoded based on data in the rest of the fields of the data record. In one embodiment, row representation transforming module 610 may convert a row into a tuple with multiple elements, where some elements of the tuple are directly encoded from raw data. Examples of transformed row representations are illustrated in FIG. 7.

FIG. 7 depicts an exemplary raw data table 710 and exemplary transformed row representations for rows in the data table 710. In some embodiments, the data table may also include system columns. The data table 710 may include three records with IDs (or primary key) being 1, 2 and 3. Each record is associated with fields such as email, age, whether the respective employee is paid (field: Paid?), and a time when the record is created (field: Time Created). Each field may be further associated with a data type that the data is stored as. For example, email may be stored as a string, age may be stored as an integer, whether the employee is paid may be stored as a Boolean, and Time Created may be stored as an integer. In a first embodiment as illustrated in 720, each row of the table 710 may be converted into a checksum, which are then used to be encoded into an invertible bloom filter.

In the embodiment illustrated in table 730, the row representation transforming module 610 may transform each row of table 710 into a two-element tuple, with a primary key and checksum, where the checksum is encoded based on the data fields for each record. Encoding each row into a two-element tuple representation with primary key may be efficient when an element is identified as a different record. With a primary key associated with the checksum, the different record may be identified in a data table more efficiently by locating the record using the primary key. In some embodiments, the field primary key is not required, and each row is transformed into a one-element representation.

In the embodiment illustrated in table 740, the row representation transforming module 610 may transform each row of table 710 into a multi-element tuple, with a primary key, and raw data from the data table 710. In one embodiment, raw data that may be encoded as part of a row representation are data that can be stored as fixed length, such as a fixed size integer, Boolean, or time. For example, the row with ID 1 includes information associated with fields email, age, paid? and time created, among which, age, paid?, and time created may be encoded as raw data into the row representation as illustrated in table 740, because these fields may be formatted as fixed-length data across all records. In one embodiment, row representation may also include timestamps such as modification timestamp and/or creation timestamp. On the other hand, emails may be encoded in the row representation after it is translated to a checksum that is of fixed length across all data records. The examples used here are for illustration purposes only. The row representation transforming module 610 may encode any type of raw data into the row representations if the data field meets certain criteria (e.g., capable of being formatted into a certain size).

Continuing with the discussion of FIG. 6, the hash function generating module 620 determines one or more hash functions for mapping row representations to invertible bloom filters. If the one or more data elements determined to be used to compare the first and second tables is the primary key alone, then the invertible bloom filter database may include at least an idSum field, a hashSum field, and a count field. In one embodiment, such as for a table without primary keys, the one or more elements determined to be used to compare the first and the second tables may be any one of the data elements. Moreover, the invertible bloom field hash function is an integer hash function.

Alternatively, if the one or more data elements determined to be used to compare the first and second tables is a combination of the primary key and a timestamp, then the invertible bloom filter database schema may include at least a first id sum field, a second id sum field, a hash sum field, and a count field. Moreover, the invertible bloom filter hash function is a two-word vector hash function where the first word is the integer hash function of the primary key and the second word is the integer epoch timestamp value of modification timestamp.

Alternatively, if the one or more data elements determined to be used to compare the first and second tables is a combination of the primary key and one or more data elements, then the invertible bloom filter database schema may include at least a first id sum field, a second id sum field, a hash sum field, and a count field. Moreover, the invertible bloom filter hash function is a two-word vector hash function where the first word is the integer hash function of the primary key and the second word is a checksum value of the one or more data elements.

In any scenario, the determined hash function is a function constructed solely of basic mathematical operations and bitwise operations. This constraint ensures successful implementation of the selected hash function on the databases the database management systems and the centralized database management system 130.

The IBF generating module 630 generates invertible bloom filters based on information generated by the modules mentioned above, including a determined size for the invertible bloom filters, determined hash functions, and transformed row representations. The IBF generating module 630 may use a SQL query to generate the invertible bloom filters. In one embodiment, the IBF generating module 630 may send instructions (e.g., a SQL query including information for generating invertible bloom filters) to each database involved in the synchronization, and each database may run the SQL query that encodes a data table into an invertible bloom filter, where the invertible bloom filter is of the determined size. For a data synchronization process performed on a source data table and a destination data table, the size of the invertible bloom filter for the source data table is the same as the size of the invertible bloom filter for the destination data table.

After the IBF encoding module 430 generates and sends instructions to the clients 105 for generating invertible bloom filters, each client 105 may encode a data table into an invertible bloom filter and sends the encoded invertible bloom filter back to the centralized database management system 130, where the IBF subtracting module 440 may perform subtraction operation on the received invertible bloom filters to identify differences, which is discussed in greater detail below.

Figure 8:
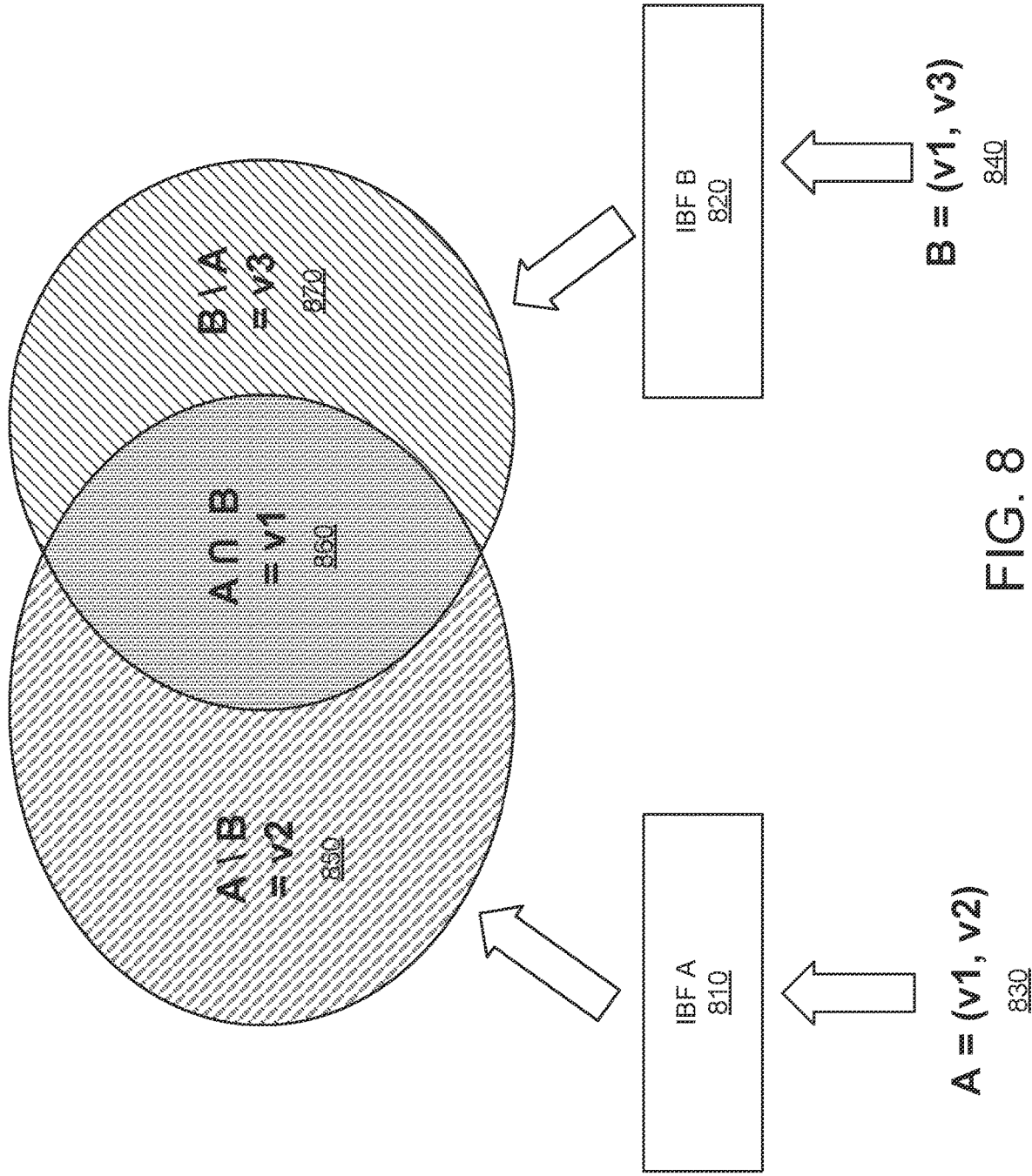
FIG. 8 depicts a high-level illustration for subtracting two invertible bloom filters, according to one embodiment.

Referring back to FIG. 4, the IBF subtracting module 440 generates a third invertible bloom filter by performing a subtraction operation on two invertible bloom filters generated by each of the source and the destination databases. The resulting third invertible bloom filter contains information regarding different elements between the first and the second invertible bloom filters that is retrieved by performing the decode operation. FIG. 8 is a high-level illustration for subtracting two invertible bloom filters. In FIG. 8, Set A 830 and set B 840 may each comprise a plurality of row representations generated by row representation transforming module 610 for two data tables. The row representations for each set may also be referred to as set members. Sets A 830 and B 840 may have some common members A∩B 860, and some different members such as set members in A but not in B, illustrated as A\B 850, and set members in B but not in A, illustrated as B\A 870. The different members may be collectively referred to as AΔB. To identify different set members, i.e., AΔB, the centralized database management system 130 may identify A\B and B\A by subtracting IBF B 820 encoded based on set B 840 from IBF A 810 encoded based on set A 830. In one embodiment, the subtraction operation may be performed via an XOR (exclusive-OR) operation between the set A 830 and the set B 840. An XOR operation may cancel out any common elements between set A 830 and set B 840, leaving only the elements that are different, i.e., AΔB. Further details illustrated with a concrete example are discussed in FIG. 9.

FIG. 9 illustrates an exemplary embodiment for subtracting a second invertible bloom filter 910 from a first invertible bloom filter 910, which results in a third invertible bloom filter 930. In FIG. 9, invertible bloom filter 910 is generated based on a first set including set members v1 and v2, where v1 is mapped to indices 231 and 232, and v2 is mapped to indices 232 and 234. Invertible bloom filter 920 is generated based on a second set including set members v1 and v3, where v1 is mapped to indices 231 and 232, and v2 is mapped to indices 232 and 233. The common element between the two sets is v1 and the different elements are v2 and v3. The IBF subtracting module 440 may subtract invertible bloom filter 920 from invertible bloom filter 910 by performing arithmetic subtraction or XOR operation for each cell of the two invertible bloom filters. For the count field, an arithmetic operator subtraction may be applied, resulting in a count of −1 for index 233 in the third invertible bloom filter 930, which indicates that the respective element is in the invertible bloom filter 920 and not in the invertible bloom filter 910. The count field for index 234 is 1, which may indicate that a respective element is in the invertible bloom filter 910 and not in the invertible bloom filter 920. For the field idSum and hashSum, an XOR operation may be applied to compute a sum taking into account of each mapped element. For example, idSum for index 231 is v1 for both the invertible bloom filters 910 and 920. The IBF subtracting module 440 performs an XOR operation on the two cells, that is, v1 XOR v1=0. Similarly, for index 232, performing an XOR operation on v1⊕v2 (idSum from invertible bloom filter 910) and v1⊕v3 (idSum from invertible bloom filter 920) cancels v1 and preserves v2 and v3, resulting in v2⊕v3 (idSum for invertible bloom filter 930 with index 232). The third invertible bloom filter resulting from the subtraction operation performed by the IBF subtracting module 440 is decoded by the IBF decoding module 450 discussed below.

Referring back to FIG. 4, IBF decoding module 450 may decode the invertible bloom filter resulted from the subtraction operation performed by the IBF subtracting module 440. The resulted invertible bloom filter may also be referred to herein as the third invertible bloom filter. The IBF decoding module 450 may scan the third invertible bloom filter for pure cells, where pure cells are cells within the third invertible bloom filter table whose Count field is equal to 1 or −1 and whose hashSum field is equal to a value that is valid for the corresponding idSum field. A hashSum field's validity may be determined by calculating a hash value using the idSum field values and comparing this calculated value to the value stored in the hashSum field. For each pure cell within the third invertible bloom filter table, if the corresponding Count field is equal to 1, then the IBF decoding module 450 may add the cell to a first listing that includes those cells included in the first table and not in the second table. Alternatively, if the corresponding Count field is equal to −1, then the cell is added to a second listing that includes those cells included in the second table and not in the first table. In an alternative embodiment, for invertible bloom filters that include a checksum, the IBF encoding module 430 may leave out the hashSum field without computing hash values using the idSum field. The IBF decoding module 450 may check purity by checking that the Count field is 1 or −1 and then compute the invertible bloom filter hash functions on the idSum fields to find the indices of cells that the element would be inserted into. Then the IBF decoding module 450 may check if the current cell's index matches one of the computed cell indices. Once all the pure cells within the third invertible bloom filter table have been added to either the first listing and the second listing, the first and second listings are compared to identify those entries with the same primary key. The identified entries represent those cells in both the first and second tables but have updates in fields. The elements in the first listing and the second listing represent differences between the first table and the second table, and based on the identified differences, the database synchronization module 460 may further generated instructions for the databases to perform for the synchronization process.

The database synchronization module 460 may generate instructions to databases and complete the synchronization process by sending instructions to database management system for updating the data tables. In one embodiment, the database synchronization module 460 may generate instructions based on the identified different element, where the instructions may include adding the element, removing the element, or updating the element. The instructions may be generated and sent to the source data table and/or the destination data table based on different goals. In the embodiment where each row representation is a two-element tuple with a key and a checksum, if a record is identified to have been updated in the source data table, the database synchronization module 460 may need to retrieve the respective record with raw data for all fields from the source data table, and send the data to the destination data table, where one or more different fields are updated based on the source data table. In the embodiment where each row representation is encoded with some elements being the raw data taken from each row, if a record is identified to have been updated in the source data table, the database synchronization module 460 may compare the row representation from the source data table with the row representation from the destination data table and identify one or more elements in the tuple that need to be updated, instead of retrieving the entire record of raw data from a database.

As discussed in the above sections, the third invertible bloom filter may contain information regarding different elements between the first and the second invertible bloom filters that is retrieved by performing the decode operation. In an alternative embodiment, instead of checking both Count field and hashSum field of a cell, the IBF decoding module 450 may skip the step of checking the hashSum field so that the hashSum field may be eliminated from the IBF. In this way, the storage size of the IBF and the computational resources required by the source databases executing the encode IBF SQL query can be reduced. A cell in the third invertible bloom filter that can be decoded to retrieve an element that is different between the first and the second invertible bloom filters is referred to as a pure cell, whereas a cell in the third invertible bloom filter that is not associated with different between the first and the second invertible bloom filters is referred to as a non-pure cell. Ideally, the Count field of a pure cell should be equal to 1 or −1; whereas the Count field of a non-pure cell should be equal to 0, less than −1, or greater than 1. However, in some cases, for non-pure cells, the Count field may also be equal to 1 or −1. For example, when a cell has 2 elements inserted from the source data table and only 1 element from the destination data table, it may have a Count field of 1. The corresponding decoding process may introduce a non-existent element, resulting in a false-positive purity situation, i.e., the cell is not actually associated with a different between the first and the second invertible bloom filters. The determination of the cell being a pure cell in this case turns out to be inaccurate. Thus, only checking the Count field of a cell may not be accurate enough to determine the cell's purity. In order to identify false-positive pure cells and increase the accuracy of the purity check, the IBF decoding module 450 may further utilize the idSum field for purity check. In some instances, the IBF decoding module 450 may first check whether a Count field is 1 or −1 and then compute the invertible bloom filter hash functions on the idSum fields to find the indices of cells that the element would be inserted into. Then the IBF decoding module 450 may check if the current cell's index matches one of the computed cell indices. If the current cell's index does not match any of the computed cell indices, then the cell is not a pure cell that is associated with a change between the first invertible bloom filter and the second invertible bloom filter.

Figure 10:
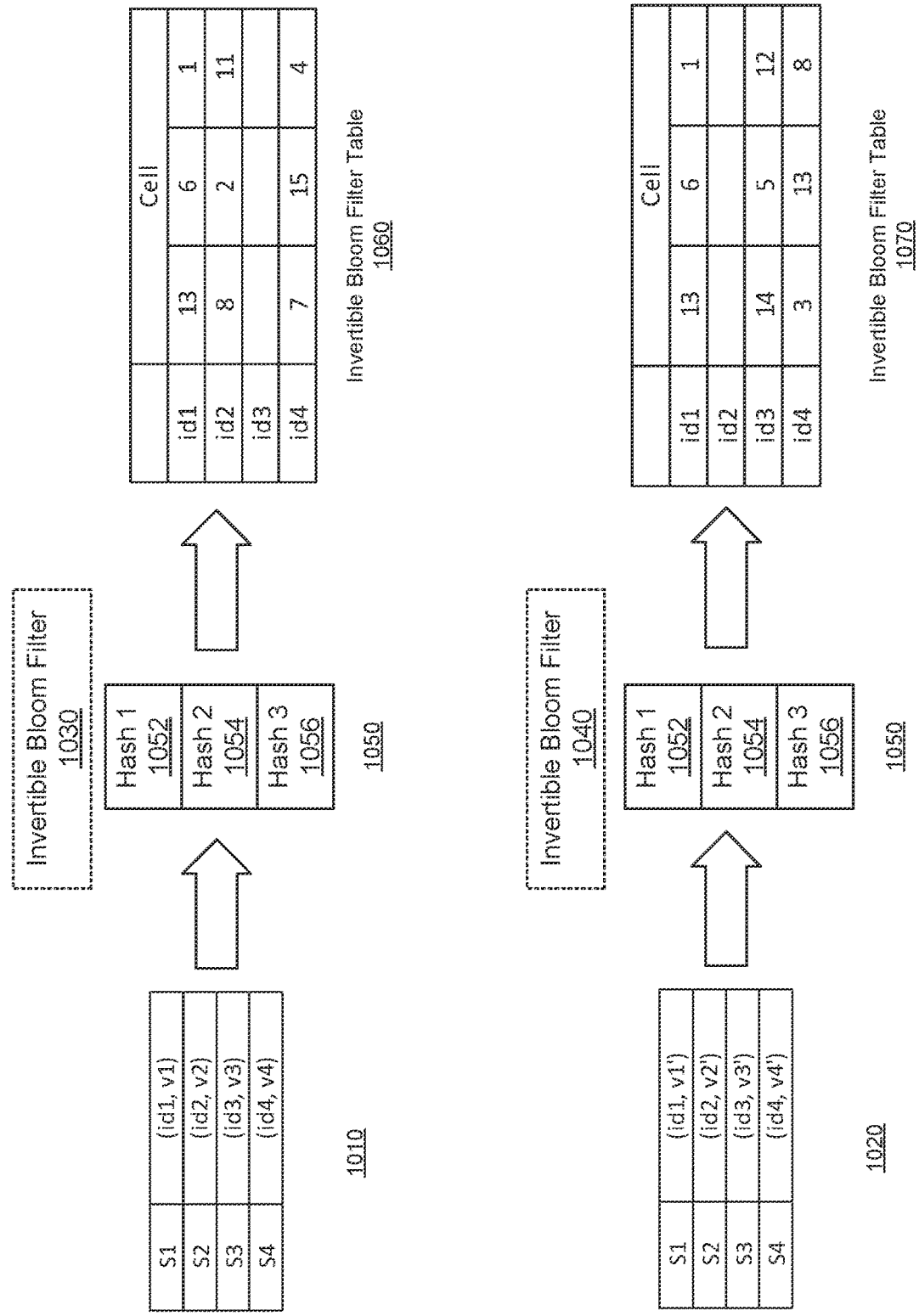
FIG. 10 illustrates another exemplary embodiment for encoding data using an invertible bloom filter, according to one embodiment.

FIG. 10 illustrates an exemplary embodiment for encoding a first data 1010 using a first IBF 1030 resulting in a first IBF table 1060; and encoding a second data 1020 using a second IBF 1040 resulting in a second IBF table 1070. In FIG. 10, the first data 1010 and the second data 1020 may each include an array of elements S1, S2, S3, and S4. While only four elements are illustrated in FIG. 10, the first data 1010 and the second data 1020 may include any number of elements. The first data 1010 and the second data 1020 may include same or different number of elements. Each element may be stored as a type of data, such as a tuple that includes a key-value pair. In some embodiments, the data 1010 and 1020 may be raw data tables; alternatively, the data 1010 and 1020 may be transformed row representations for rows in the raw data tables. The data 1010 and 1020 may include a record in each element, and the records are associated with IDs (or primary keys), for example, id1, id2, id3, id4, etc. In some embodiments, the data 1010 and 1020 may be two-element tuples, with elements including such as a primary key and checksum, and the checksum is encoded based on the data fields of each record. Alternatively, the data 1010 and 1020 may be multi-element tuples, with elements including a primary key, and raw data.

In one example, the first data 1010 and the second data 1020 may each comprise four elements, and each element is a key-value pair, as shown in FIG. 10. In the first data 1010, element S1 includes (id1, v1), element S2 includes (id2, v2), element S3 includes (id3, v3), and element S4 includes (id4, v4). Similarly, in the second data 1020, element S1 includes (id1, v1'), element S2 includes (id2, v2'), element S3 includes (id3, v3'), and element S4 includes (id4, v4'). The first data 1010 and the second data 1020 may have some common elements, e.g., S1, here, v1=v1'. The first data 1010 and the second data 1020 may have some different elements. For example, S2 is in the first data 1010 but not in the second data 1020, here, v2' is empty; S3 is in the second data 1020 but not in the first data 1010, here v3 is empty; and S4 has different values in the first data 1010 and the second data 1020, here v4≠v4'.

The illustrated IBFs 1030 and 1040 may use a same set of hash functions 1050 such as hash functions 1052, 1054, and 1056 to map each element S1, S2, S3, and S4 to the respective indexed cells, where each hash function may map each element to a respective indexed cell. The IBF 1030 maps the elements of the first data 1010 into the first IBF table 1060 and the IBF 1040 maps the elements of the second data 1020 into the second IBF table 1070. The IBF tables 1060 and 1070 may be initialized with a plurality of cells, for example, 15 cells with cell indices from 1 to 15. In one example, element S1 in the first data 1010 may be mapped to three indexed cells of the first IBF table 1060, i.e., Cell 13, Cell 6, and Cell 1, using the three hash functions 1052, 1054, and 1056. Each hash function may map an element to a different indexed cell. Since the first data 1010 and the second data 1020 have the same element S1, using the same set of hash functions 1050, the second IBF 1040 maps element S1 in the second data 1020 to the same indexed cells, i.e., Cell 13, Cell 6, and Cell 1, as shown in the second IBF table 1070. In comparison, element S4 is different in the first data 1010 and the second data 1020, i.e., v4≠v4'. In this case, by using the same set of hash functions 1050, S4 of the two data 1010 and 1020 is mapped into different cells in the IBF tables 1060 and 1070. As shown in FIG. 10, element S4 in the first data 1010 is mapped to Cell 7, Cell 15, and Cell 4 in the first IBF table 1060 and element S4 in the second data 1020 is mapped to Cell 3, Cell 13, and Cell 8 in the second IBF table 1070. The value change of the element in the data 1010 and 1020 is associated with the different indexed cells in the IBF tables 1060 and 1070, i.e., different cell indices. To identify the different elements in the first data 1010 and the second data 1020, the centralized database management system 130 may subtract the IBF encoded based on the second data 1020 from the IBF encoded based on the first data 1010. The IBF tables 1060 and 1070 are part of the IBF 1110 and 1120 (shown in FIG. 11), which store information associated with each element mapped to a respective index. Further details with a concrete example are discussed in FIG. 11.

FIG. 11 illustrates an exemplary embodiment for subtracting a second invertible bloom filter 1120 from a first invertible bloom filter 110, which results in a third invertible bloom filter 1130. Referring back to FIG. 10, the IBF 1110 is generated based on a first data 1010 including elements S1, S2, S3, and S4. The IBF 1120 is generated based on a second data 1020 including elements S1, S2, S3, and S4. The common element between the two data 1010 and 1020 is S1 and the different elements are S2, S3, and S4. In FIG. 11, the IBF subtracting module 440 may subtract the IBF 1120 from the IBF 1110 by performing arithmetic subtraction or XOR operation for each cell of the two invertible bloom filters to generate a third IBF 1130. The third IBF 1130 then can be decoded by the IBF decoding module 450 to identify the different elements. The IBF decoding module 450 may scan the third invertible bloom filter for pure cells by first checking the Count field of each cell. If the cell in the third IBF 1130 has a Count field equal to a critical value, e.g., 1 or −1, then the cell can be determined as a candidate pure cell. If the corresponding Count field is equal to 1, then the IBF decoding module 450 may add the cell to a first listing that includes those cells included in the first IBF 1110 and not in the second IBF 1120. Alternatively, if the corresponding Count field is equal to −1, then the cell is added to a second listing that includes those cells included in the second IBF 1120 and not in the first IBF 1110. If the corresponding Count field is equal to 0, the IBF decoding module 450 may not determine the cell as a candidate pure cell.

As discussed in previous sections, without checking the hashSum field, by only checking the Count field, it may be not accurate enough to determine the purity of the cells. For example, during the decoding process, an intermediate third IBF 1140 may be generated as shown in FIG. 11. Comparing Cell 6, Cell 9 and Cell 19 between the IBF 1130 and the IBF 1140, the Count fields of these cells change from 0 to 1 or −1, introducing non-pure and/or false-positive pure cells. In some embodiments, in order to improve the accuracy of purity check, the IBF decoding module 450 may further compute the invertible bloom filter hash functions 1050 on the idSum fields to find the indices of cells that the element would be inserted into. Then the IBF decoding module 450 may check if the current cell's index matches one of the computed cell indices. If the current cell's index matches one of the computed cell indices, the current cell can be determined as a candidate pure cell and added to the first listing or the second listing. If the current cell's index does not match any of the computed cell indices, the current cell is determined to be a non-pure cell and is not added to either of the listings.

Take Cell 2 in the IBF 1140 as an example. The IBF decoding module 450 first identifies that the Count field of Cell 2 is 1 and then computes the indices of cells the element would be inserted into. In this case, the idSum of Cell 2 is id2, corresponding to S2 in data 1010 in FIG. 10. By using the hash functions 1050, the first IBF 1030 should map S2 in data 1010 into Cell 8, Cell 2, and Cell 11 as shown in the first IBF table 1060. Therefore, the current cell's index "2" matches one of the computed cell indices, i.e., "8," "2," and "11." The IBF decoding module 450 will add Cell 2 to the first listing indicating that Cell 2 is included in the first IBF 1110 and not in the second IBF 1120. In contrast, Cell 10 in the IBF table 1040 has a Count field of −1 and its idSum is id3. Having a Count field of −1 indicates that Cell 10 may be a cell that is included in the second IBF 1120 but not in the first IBF 1110. However, by computing the IBF1040 with hash functions 1050 on the idSum, id3 in the second data 1020 should be mapped to Cell 14, Cell 5, and Cell 12, as shown in the IBF table 1070. Thus, the current cell's index "10" does not match any of the computed cell indices, i.e., "14," "5," and "12." The IBF decoding module 450 then determines Cell 10 is non-pure cell and is not associated with a change between the first IBF 1110 and the second IBF 1120.

By checking the Count field and idSum field of each cell in the IBF 1140, the decoding module 450 can add all candidate pure cells in the IBF 1140 to either the first listing or the second listing. The entries in the first listing and the second listing represent differences between the first IBF 1110 and the second IBF 1120. The first and second listings can be further compared to identify those entries with the same idSum. The identified entries represent those cells in both the first and second tables but have updates in fields. Based on the elements in the first listing and the second listing, the decoding module 450 can continue the decoding process to identify the change of elements between the first data 1010 and the second data 1020.

In some embodiments, the IBF 1040 may include false-positive pure cells. A false-positive pure cell is a cell whose Count field is equal to a critical value, e.g., 1 or −1, and whose cell index matches one of the computed cell indices but is not associated with a change between the first IBF 1110 and the second IBF 1120. In some embodiments, a false-positive pure cell may be associated with an element that does not exist in the first data 1010 or the second data 1020. For example, Cell 9 in the IBF 1140 has a Count field equal to 1, indicating that Cell 9 may be a cell that is included in the first IBF 1110 but not in the second IBF 1120. The corresponding idSum field of Cell 9 is id7. By computing the IBF1030 with hash functions 1050 on the idSum, id7 should be mapped to Cell 14, Cell 2, and Cell 9. Thus, the current cell's index "9" matches one of the computed cell indices, i.e., "14," "2," and "9." The IBF decoding module 450 then determines Cell 9 is candidate pure cell and adds Cell 9 to the first listing. However, in the subsequent decoding process, the IBF decoding module 450 may find that neither the first data 1010 nor the second data 1020 include an element that is associated with the idSum, id7, as shown in FIG. 10. Therefore, the IBF decoding module 450 determines Cell 9 as a false-positive pure cell and is not associated with a change between the first data 1010 and the second data 1020. If the IBF decoding module 450 finds id7 in the first data 1010, then Cell 9 may be determined as being associated with a change between the first IBF 1110 and the second IBF 1120, and the decoding module 450 can continue the decoding process to identify the change.

Alternatively, a false-positive pure cell may be associated with an element that is included in the first data 1010 and/or the second data 1020. Take Cell 6 in the IBF table 1140 as another example. The Count field of Cell 6 is equal to 1, indicating Cell 6 is associate with an element that is included in the first data 1010 but not in the second data 1020. The idSum of Cell 6 is id1. By computing the IBF1030 with hash functions 1050 on the idSum, id1 should be mapped to Cell 13, Cell 6, and Cell 1 as shown in the IBF table 1060. Thus, the current cell's index "1" matches one of the computed cell indices, i.e., "13," "6," and "1." The IBF decoding module 450 may add Cell 6 to the first listing. In the subsequent decoding process, the IBF decoding module 450 may check the Count field and idSum field of cells with the computed cell indices, i.e., Cell 13, Cell 6, and Cell 1. If id1 is indeed associated with a different element between the first data 1010 and the second data 1020, none of the cells with the computed cell indices can have both zero Count field and zero idSum field. In this case, the IBF decoding module 450 identifies that the cell with one of the computed cell indices, i.e., Cell 1, has both zero Count field and zero idSum field, indicating id1 is not associated with a different element between the first data 1010 and the second data 1020. Therefore, decoding Cell 1 and Cell 6 generates conflict information, and the IBF decoding module 450 determines that Cell 6 is a false-positive pure cell and is not associated with a change between the first data 1010 and the second data 1020. Cell 6 is not added to the first listing.

In some embodiments, during the decoding process, the IBF decoding module 450 may further compute the invertible bloom filter hash functions 1050 on the idSum field to find a value associated with the key-value pair in each element in the data. In one example, the computed value may be associated with a checksum in a two-element tuple. If the key-value pair changes, the associated value should also be different. For example, element S4 in the first data 1010 is different from element S4 in the second data 1020, and v4≠v4' as shown in FIG. 10. The IBF decoding module 450 computes the hash functions 1050 on id4 to find a first value ($V_{1st}$) associated with v4 should be different from the second value ($V_{2nd}$) associated with v4'. Because v4≠v4', indicating the first data 1010 and second data 1020 have an update in element S4, the idSum id4 may be added to both the first listing and the second listing by the IBF decoding module 450.

Alternatively, in a false-positive pure cell case, two indexed cells may have a same value in the idSum field but opposite values in the Count fields (e.g., 1 and −1). The two indexed cells may be added to the first listing and the second listing respectively. Being added to both listings may indicate that there is an update of the corresponding element between the first data 1010 and the second data 1020. However, during the decoding process, the IBF decoding module 450 may find that the two indexed cells are identical except their values in the Count fields. For example, their corresponding values in the idSum field and the associated value $V_{1st}$ and $V_{2nd}$ may be identical, thus indicating there is no updates of the corresponding element. This conflicts with their opposite values in the Count field. In this case, the IBF decoding module 450 determines that two indexed cells are false-positive pure cells and are not associated with a change between the first data 1010 and the second data 1020.

FIG. 12 illustrates one exemplary embodiment for the centralized database management system 130 to determine a change between a first invertible bloom filter and a second invertible bloom filter. The centralized database management system 130 may first generate 1210 a third invertible bloom filter by subtracting the second invertible bloom filter from the first invertible bloom filter. Each of the three invertible bloom filters comprises a plurality of indexed cells. The centralized database management system 130 may determine 1220 a value of the Count field in a first indexed cell of the third invertible bloom filter, and the first indexed cell is associated with a first index. The value of the Count field may be 1, 0, or −1. If the value of the Count field is a critical value, for example, 1 or −1, the centralized database management system 130 may read 1230 the value of the idSum field of the first indexed cell and compute 1240 the indices corresponding to the value of the idSum field. The centralized database management system 130 may compute the invertible bloom filter hash functions on the idSum fields to find the indices of cells. These indices correspond to the cells that the idSum associated element would be inserted into. Then the centralized database management system 130 may compare 1250 the first index with each of the computed indices to check if the first indexed cell's index matches one of the computed cell indices. If the first indexed matches one of the computed cell indices, the first indexed cell can be determined as a candidate pure cell and added to the first listing or the second listing. If the first index does not match any of the computed cell indices, then the centralized database management system 130 may determine 1260 the first indexed cell is not a cell associated with a change between the first invertible bloom filter and the second invertible bloom filter. With this method of determining a change between a first invertible bloom filter and a second invertible bloom filter, the centralized database management system 130 does not need to compute the hashSum of the indexed cells.

ADDITIONAL CONFIGURATION CONSIDERATIONS

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for improving training data of a machine learning model through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined herein.

What is claimed is:

1. A method comprising:
   determining a set of hash functions for mapping elements in a first data table to a first invertible bloom filter and mapping elements in a second data table to a second invertible bloom filter;
   generating, using the set of hash functions, the first invertible bloom filter corresponding to the first data table and the second invertible bloom filter corresponding to the second data table;
   generating a third invertible bloom filter by subtracting the second invertible bloom filter from the first invertible bloom filter, wherein each of the three invertible bloom filters comprises a plurality of indexed cells;
   determining a first total count of elements in a first indexed cell of the third invertible bloom filter, the first indexed cell associated with a first index;
   responsive to the first total count of elements being equal to a pre-determined value, reading a first sum of elements in the first indexed cell;
   computing one or more indices corresponding to the determined first sum of elements;
   comparing the first index with each of the computed indices; and
   responsive to the first index not matching any of the computed indices, determining that the first indexed cell in the third invertible bloom filter is not a cell associated with a change between the first data table and the second data table, wherein determining that the first indexed cell is not associated with the change does not use a hashSum of the first indexed cell.

2. The method of claim 1, further comprising:
   determining a second total count of elements in a second indexed cell of the third invertible bloom filter, the second indexed cell associated with a second index; and
   responsive to the second total count of elements being equal to zero, determining that the second indexed cell in the third invertible bloom filter is not associated with the change between the first invertible bloom filter and the second invertible bloom filter.

3. The method of claim 1, further comprising identifying the change by decoding the third invertible bloom filter.

4. The method of claim 1, further comprising:
   determining a second total count of elements in a second indexed cell of the third invertible bloom filter, the second indexed cell associated with a second index;

responsive to the second total count of elements being equal to the pre-determined value, reading a second sum of elements in the second indexed cell;

computing one or more indices corresponding to the determined second sum of elements;

comparing the second index with each computed index corresponding to the determined second sum of elements; and responsive to the second index matching one of the computed indices corresponding to the second sum of elements, determining the second indexed cell in the third invertible bloom filter as a candidate cell associated with the change between the first invertible bloom filter and the second invertible bloom filter.

5. The method of claim 4, further comprising:

determining a third total count of elements in a third indexed cell of the third invertible bloom filter, the third indexed cell associated with a third index;

determining that the second indexed cell is identical to the third indexed cell except that the second total count of elements has an opposite value of the third total count of elements; and determining that the second indexed cell is not a cell associated with the change between the first invertible bloom filter and the second invertible bloom filter.

6. The method of claim 4, further comprising:

determining one or more indexed cells of the third invertible bloom filter, each of the one or more indexed cells associated with one of the computed indices corresponding to the determined second sum of elements;

reading a total count of elements and a sum of elements in each determined indexed cells; and responsive to both of the total count of elements and the sum of elements of one determined indexed cell being equal to zero, determining that the second indexed cell is not a cell associated with the change between the first invertible bloom filter and the second invertible bloom filter.

7. The method of claim 1, further comprising:

decoding the first and second invertible bloom filters using the set of hash functions to obtain the first and second data tables;

determining whether the first and second data tables comprise an element corresponding to the second sum of elements; and responsive to neither of the first and second data tables comprising the element corresponding to the second sum of elements, determining that the second indexed cell is not a cell associated with the change between the first invertible bloom filter and the second invertible bloom filter.

8. The method of claim 1, further comprising:

decoding the first and second invertible bloom filters using the set of hash functions to obtain the first and second data tables;

determining whether the first and second data tables comprise an element corresponding to the second sum of elements; and responsive to both of the first and second data tables comprising the element corresponding to the second sum of elements, determining that the second indexed cell is associated with the change between the first invertible bloom filter and the second invertible bloom filter.

9. The method of claim 1, wherein each indexed cell of each invertible bloom filter comprises: an index, sum of elements mapped to the respective index, and total count of elements mapped to the respective index.

10. A non-transitory computer readable medium configured to store instructions, the instructions when executed by one or more processors causing the processor to perform operations comprising:

determining a set of hash functions for mapping elements in a first data table to a first invertible bloom filter and mapping elements in a second data table to a second invertible bloom filter;

generating, using the set of hash functions, the first invertible bloom filter corresponding to the first data table and the second invertible bloom filter corresponding to the second data table;

generating a third invertible bloom filter by subtracting the second invertible bloom filter from the first invertible bloom filter, wherein each of the three invertible bloom filters comprises a plurality of indexed cells;

determining a first total count of elements in a first indexed cell of the third invertible bloom filter, the first indexed cell associated with a first index;

responsive to the first total count of elements being equal to a pre-determined value, reading a first sum of elements in the first indexed cell;

computing one or more indices corresponding to the determined first sum of elements;

comparing the first index with each of the computed indices; and responsive to the first index not matching any of the computed indices, determining that the first indexed cell in the third invertible bloom filter is not a cell associated with a change between the first data table and the second data table, wherein determining that the first indexed cell is not associated with the change does not use a hashSum of the first indexed cell.

11. The non-transitory computer readable medium of claim 10, wherein the operations further comprise:

determining a second total count of elements in a second indexed cell of the third invertible bloom filter, the second indexed cell associated with a second index; and responsive to the second total count of elements being equal to zero, determining that the second indexed cell in the third invertible bloom filter is not associated with the change between the first invertible bloom filter and the second invertible bloom filter.

12. The non-transitory computer readable medium of claim 10, wherein the operations further comprise: identifying the change by decoding the third invertible bloom filter.

13. The non-transitory computer readable medium of claim 10, wherein the operations further comprise:

determining a second total count of elements in a second indexed cell of the third invertible bloom filter, the second indexed cell associated with a second index;

responsive to the second total count of elements being equal to the pre-determined value, reading a second sum of elements in the second indexed cell;

computing one or more indices corresponding to the determined second sum of elements;

comparing the second index with each computed index corresponding to the determined second sum of elements; and responsive to the second index matching one of the computed indices corresponding to the second sum of elements, determining the second indexed cell in the third invertible bloom filter as a candidate cell associated with the change between the first invertible bloom filter and the second invertible bloom filter.

14. The non-transitory computer readable medium of claim 13, wherein the operations further comprise:
   determining a third total count of elements in a third indexed cell of the third invertible bloom filter, the third indexed cell associated with a third index;
   determining that the second indexed cell is identical to the third indexed cell except that the second total count of elements has an opposite value of the third total count of elements; and
   determining that the second indexed cell is not a cell associated with the change between the first invertible bloom filter and the second invertible bloom filter.

15. The non-transitory computer readable medium of claim 13, wherein the operations further comprise:
   determining one or more indexed cells of the third invertible bloom filter, each of the one or more indexed cells associated with one of the computed indices corresponding to the determined second sum of elements;
   reading a total count of elements and a sum of elements in each determined indexed cells; and
   responsive to both of the total count of elements and the sum of elements of one determined indexed cell being equal to zero, determining that the second indexed cell is not a cell associated with the change between the first invertible bloom filter and the second invertible bloom filter.

16. The non-transitory computer readable medium of claim 10, wherein the operations further comprise:
   decoding the first and second invertible bloom filters using the set of hash functions to obtain the first and second data tables;
   determining whether the first and second data tables comprise an element corresponding to the second sum of elements; and
   responsive to neither of the first and second data tables comprising the element corresponding to the second sum of elements, determining that the second indexed cell is not a cell associated with the change between the first invertible bloom filter and the second invertible bloom filter.

17. The non-transitory computer readable medium of claim 10, wherein the operations further comprise:
   decoding the first and second invertible bloom filters using the set of hash functions to obtain the first and second data tables;
   determining whether the first and second data tables comprise an element corresponding to the second sum of elements; and
   responsive to both of the first and second data tables comprising the element corresponding to the second sum of elements, determining that the second indexed cell is associated with the change between the first invertible bloom filter and the second invertible bloom filter.

18. The non-transitory computer readable medium of claim 10, wherein each indexed cell of each invertible bloom filter comprises: an index, sum of elements mapped to the respective index, and total count of elements mapped to the respective index.

* * * * *